United States Patent

Wong et al.

[11] Patent Number: 5,885,646
[45] Date of Patent: Mar. 23, 1999

[54] PROCESS FOR MAKING FLAVORED NUT SPREADS HAVING RELATIVELY HIGH SUGAR LEVELS BY USING FLUID SUSPENSION OF SUGAR AND OIL

[75] Inventors: Vincent York-Leung Wong; Richard Joseph Sackenheim, both of Hamilton, Ohio

[73] Assignee: The Procter & Gamble Company, Cincinnati, Ohio

[21] Appl. No.: 958,349

[22] Filed: Oct. 27, 1997

[51] Int. Cl.[6] .................................................. A23L 1/38
[52] U.S. Cl. ........................ 426/633; 426/654; 426/613
[58] Field of Search .............................. 426/98, 631, 632, 426/633, 654, 613

[56] References Cited

U.S. PATENT DOCUMENTS

| | | | |
|---|---|---|---|
| H1395 | 1/1995 | Prosser | 426/633 |
| 3,978,246 | 8/1976 | Chozianin et al. | 426/633 |
| 3,995,068 | 11/1976 | Billerbeck et al. | 426/324 |
| 5,079,027 | 1/1992 | Wong et al. | 426/633 |
| 5,230,919 | 7/1993 | Walling et al. | 426/633 |
| 5,490,999 | 2/1996 | Villagran et al. | 426/633 |
| 5,505,982 | 4/1996 | Krawczyk et al. | 426/660 |
| 5,585,135 | 12/1996 | Patterson et al. | 426/660 |

*Primary Examiner*—Nina Bhat
*Attorney, Agent, or Firm*—Melody A. Jones; Gerry S. Gressel; Karen F. Clark

[57] ABSTRACT

A process for preparing nut spreads having a sugar level of from about 15 to about 50% and especially flavored nut spreads having such relatively high levels of sugar. A substantially homogeneous blend is prepared from a fluid suspension consisting essentially of an intimate mixture of sugar, liquid oil and lecithin as a surfactant to improve the fluidity of the suspension, a nut solids-containing mixture and a flavorant that is preferably added to the fluid suspension. The resulting flavored nut spreads are more fluid and softer than products made without using the fluid suspension.

22 Claims, No Drawings

PROCESS FOR MAKING FLAVORED NUT SPREADS HAVING RELATIVELY HIGH SUGAR LEVELS BY USING FLUID SUSPENSION OF SUGAR AND OIL

TECHNICAL FIELD

This application relates to a fluid suspension of sugar and oil that is useful in making nut spreads, especially peanut butters, having relatively high levels of sugar. This application particularly relates to a process for making flavored nut spreads having relatively high levels of sugar using this fluid suspension of sugar and oil.

BACKGROUND OF THE INVENTION

Sweetness is one of the key attributes of a flavored nut spread such as a flavored peanut spread. The desired sweetness in a flavored peanut spread is obtained by adding sugar at levels of about 15% or greater. The process for adding and uniformly distributing sugar at that level in peanut paste is difficult to achieve because of the high viscosity of the paste and the need to use finely milled sugar. The high particle surface area between the sugar particles and the peanut paste increases the energy required to wet and deagglomerate the mixture. As a result, a long mixing time can be required to reduce the viscosity of the flavored spread to an easily spreadable consistency.

The mixing time for flavored spreads can be reduced by using a more intensive mixing process such as high shear mixing. However, the equipment required for such high shear mixing (e.g., colloid mill) can be expensive. Also, intensive mixing such as high shear mixing can degrade the flavor quality of the flavored nut spread.

Accordingly, it would be desirable to be able to formulate a flavored peanut spread that: (1) is easily spreadable; (2) has a high level of sugar; (3) does not require high shear mixing equipment to make; and (4) has the flexibility to provide different flavored products.

DISCLOSURE OF THE INVENTION

The present invention relates to a process for preparing nut spreads having a sugar level of from about 15 to about 50% and especially flavored nut spreads having such relatively high levels of sugar. This process comprises the step of forming a substantially homogeneous blend from:

a. a fluid suspension which consists essentially of:
  (1) an intimate mixture of sugar and an edible liquid oil wherein the ratio of sugar to oil is about 0.7:1 or greater;
  (2) an effective amount of an edible surfactant capable of imparting increased fluidity to the intimate mixture of oil and sugar; and
b. a nut solids-containing mixture, which comprises:
  (1) from about 20 to about 55% nut solids;
  (2) from about 30 to about 60% fat;
  (3) optionally sugar;
c. wherein the ratio of the fluid suspension to the nut solids-containing mixture is such that the resulting nut spread has a sugar level of from about 15 to about 50%.

The present invention further relates to flavored nut spreads that can be made by this process. These flavored nut spreads have a spreadability value of from about 500 to about 1400 gram force and comprise:

a. a flavor enhancing amount of a flavorant;
b. from about 20 to about 55% nut solids;
c. from about 30 to about 60% total fat;
d. from about 15 to about 50% sugar.

A key aspect of the present invention is the preparation of a fluid sugar and oil suspension that has a high sugar solids to oil ratio, i.e., about 0.7:1 or higher. Another key aspect of the present invention is the inclusion of an edible surfactant, preferably lecithin or a polyglycerol ester emulsifier. At higher sugar solids levels in the fluid suspension, it was discovered that the inclusion of lecithin or a polyglycerol ester emulsifier significantly improves the fluidity of the suspension of sugar and oil. For example, a fluid suspension of sugar and peanut oil in a ratio of 70:30 has a dough-like consistency. However, the inclusion of 1% lecithin transformed this mixture into a flowable suspension.

Having the sugar in the form of a fluid suspension with the oil allows the sugar to be easily mixed with the nut solids-containing mixture, even though the level of sugar is relatively high. Indeed, the combining of the fluid suspension of sugar and oil with the nut solids-containing mixture can be made continuous such as by co-blending the two streams in a static or in-line mixer or series of such mixers. This simplification of the mixing process significantly reduces the capital cost for making flavored peanut butter/spreads. Surprisingly, when the flavorants are added directly to the fluid suspension before it is blended with the nut solids-containing mixture, the resultant flavored spread has a much lower viscosity that is achieved after less mixing time than when the flavorant is added directly to the spread.

The flavored peanut spreads made with this fluid suspension of sugar and liquid oil are also more fluid and softer than identically formulated products made without the fluid suspension. It is believed that this higher fluidity is due to the order of addition of the edible surfactant (e.g., lecithin) in making the flavored spread. Including the lecithin in the fluid suspension enables the lecithin to be efficiently adsorbed at the interface between the sugar and oil. This lowers the interfacial surface tension between the sugar and oil that results in an increase in fluidity. Conversely, adding lecithin to the nut solids-containing mixture has been found to be less effective in increasing fluidity because the lecithin is preferentially adsorbed by the peanut protein.

DETAILED DESCRIPTION OF THE INVENTION

A. Definitions

As used herein, the term "nut spread" means a spreadable food product made primarily from nut solids and fat/oil, plus other ingredient such as nut butter stabilizers, flavorants, flavor enhancers, bulking agents, emulsifiers, etc. Nut spreads include, but are not limited to, "nut butters" and "peanut butters" as these terms are defined by the standards of identity of the Food and Drug Administration.

As used herein, the term "total fat" refers to the total amount of fat and oil present in the nut spread. The term "fat" usually refers to triglycerides (and their corresponding substitutes) that are solid or plastic at ambient temperature, while the term "oil" usually refers to triglycerides (and their corresponding substitutes) that are liquid or fluid at ambient temperature.

As used herein, the term "comprising" means various components can be conjointly employed in the nut spreads of the present invention and that various steps can be conjointly employed in preparing these spreads. Accordingly, the terms "consisting essentially of" and "consisting of" are embodied in the term comprising.

All amounts, ratios, parts and percentages used herein are based on weight unless otherwise specified.

B. Fluid Suspension of Sugar and Oil

The fluid suspensions of the present invention are a key component in preparing nut spreads, especially flavored nut spreads, having a relatively high level of sugar (i.e., about 15% or greater) that are easy to spread. By "fluid suspension" it is meant that the suspension is sufficiently flowable at temperatures of from about 50° to about 100° F. (from about 10° to about 37.8° C.) such that it is easily combinable with the nut solids-containing mixture without the need of intense mixing such as high shear mixing. Typically, these fluid suspensions have a viscosity of from about 200 to about 30,000 centipoise (measured at 6.8 sec$^{-1}$), and preferably from about 200 to about 3500 centipoise.

The fluid suspensions of the present invention are primarily formulated from an intimate mixture of sugar and liquid edible oil (i.e., is liquid at ambient temperatures). The ratio of sugar to oil for the fluid suspension of the present invention is about 0.7:1 or greater, and preferably about 1:1 or greater. Typically this ratio is in the range from about 0.7:1 to about 3:1, and preferably from about 1.1:1 to about 1.5:1.

Suitable sugars that can be used in these fluid suspensions include, for example, sucrose, fructose, dextrose, honey, high fructose corn syrup, lactose, maltose, and maltose syrups. The preferred sugars are sucrose and high fructose corn syrups. The liquid oil used is typically that which naturally comes from the nut or seed during the formation of the nut paste used in the nut solids-containing mixture. However, oils such as soybean oil, palm oil, cottonseed oil, coconut oil, walnut oil and other suitable edible oils can also be used, in whole or in part, in making the fluid suspensions of the present invention. Preferably, peanut oil expressed during formation of the peanut paste is the primary oil used in making fluid suspensions according to the present invention. For fluid suspensions to be used in making nut spreads from other nuts and oil seeds, such as the sunflower seeds, mixtures of oils can be preferred for flavor.

Low calorie and zero calorie fat and oil substitutes, such as sucrose polyesters of long chain fatty acid (olestra) and other polyol polyesters of fatty acids, can also be used in making these fluid suspensions. See, for example, U.S. Pat. No. 3,600,186 (Mattson et al.) issued Aug. 17, 1971; U.S. Pat. No. 5,422,131 (Elsen et al), issued Jun. 6, 1995; U.S. Pat. No. 5,419,925 (Seiden et al), issued May 30, 1995; U.S. Pat. No. 5,071,669 (Seiden), issued Dec. 10, 1991, all of which are incorporated by reference. Mixed triglycerides made from medium and long chain saturated and/or unsaturated fatty acids can also be used as the fat/oil herein. See, for example, U.S. Pat. No. 5,288,512 (Seiden), issued Feb. 22, 1994, which is incorporated by reference. Oils that contain medium chain triglycerides can also be used as the fat/oil source. See U.S. Pat. No. 4,863,753 (Hunter et al), issued Sep. 5, 1989, which is incorporated by reference.

Another key component of the fluid suspensions of the present invention is an edible surfactant in an amount capable of imparting increased fluidity to the intimate mixture of oil and sugar. Typically, the surfactant is included in the fluid suspension in an amount from about 0.01 to about 3%, and preferably from about 0.5 to about 1%. Suitable edible surfactants include any food compatible emulsifier such as mono- and di-glycerides, lecithin, sucrose monoesters, polyglycerol esters, sorbitan esters, polyethoxylated glycols and mixtures thereof. The preferred edible surfactants for use herein are lecithin and polyglycerol ester emulsifiers, with lecithin being especially preferred.

A number of other edible ingredients typically found in nut spreads and nut butters can be also be included in the fluid suspension if desired. These include salt or salt substitutes such as sodium chloride, potassium chloride, sodium chloride/potassium chloride mixtures, and seasoned salts, citric acid, nut butter stabilizers (to be defined hereafter), fiber such as cellulose, nut paste, defatted peanut solids and the like. The presence of these other edible materials, and especially their level, in the fluid suspension is typically dependent on whether these ingredients are also present in the nut solids-containing mixture.

In order to minimize grittiness, the water-soluble solids in the fluid suspension such as the sugar, salt and the like preferably have a relatively fine particle size. Typically, the water-soluble solids have a mean particle size of about 20 microns or less (as measured by a Malvern laser) with at least about 90% of the particles having a particle size of about 35 microns or less.

C. Nut Solids-Containing Mixture

The nut solids-containing mixture is another key component in preparing nut spreads, especially flavored nut spreads, according to the present invention. The composition of these nut solids-containing mixtures can be the same or similar in composition to conventional nut spreads and nut butters well known in the art or can have a different composition. For example, one potential difference for the nut solids-containing mixtures of the present invention is that they can comprise a higher level of sugar than would typically be found in conventional nut spreads and nut butters. The nut solids-containing mixture according to the present invention can even comprise essentially a nut paste, with all of the sugar and other ingredients (e.g., salt, emulsifier, nut butter stabilizer) being delivered by the fluid suspension. Indeed, the composition of the nut solids-containing mixture typically depends on what ingredients, and levels of those ingredients, are provided by the fluid suspension.

A primary ingredient of the nut solids-containing mixture according to the present invention is nut solids derived from nuts and oil seeds. While the present invention will often be described in terms of nut solids derived from peanuts, it should be understood that other sources of nut solids such as almonds, pecans, walnuts, cashews, filberts, macadamia nuts, Brazilians, hazel nuts, sunflower seeds, sesame seeds, pumpkin seeds and soybeans can be used as well. Mixtures of these nut solids can also be used.

The flavor of the nut paste can be that of the natural (raw) nut or is more typically developed by subjecting the nuts to a thermal operation, usually roasting. For example, peanuts can be roasted in a hot air convection roaster (e.g., a Jet Zone roaster manufactured by Wolverine). The flavor character and intensity are controlled by the roast temperature and the roast time.

Generally, roasting peanuts at a higher roast temperature and shorter time has resulted in the most desirable peanut flavor. However, there is a limit to the amount of peanut flavor that can be developed by this approach. Roasting peanuts at higher temperatures causes a non-uniform temperature profile and in turn a non-uniform flavor profile within the peanut. It is this non-uniformity in flavor (darker roast outside and lighter roast inside) that creates a more desirable peanut flavor relative to peanuts roasted to the same color but at a lower roast temperature. However, because of the non-uniform roasting profile within the peanut, roasting to a darker roast color to further intensify peanut flavor can cause over-roasting of the outer peanut to occur, leading to burnt notes.

A way to intensify peanut flavor while minimizing burnt notes caused by over-roasting is to combine peanuts roasted separately to various roast colors. A combination of light and dark roasted peanuts results in a more intense and preferred peanut flavor character. The combination of a light and dark roast fraction simulates the flavor profile developed within a peanut that is roasted at high roast temperatures. This flavor profile can be easily manipulated by varying the proportion of peanuts roasted to different roast colors. Moreover, peanut flavor perception can also be manipulated by controlling the grind size of the various roasted peanut fractions. For example, peanuts roasted to a darker roast color can be milled to a very fine particle size without losing flavor because of the low volatility of the flavors generated during roasting. Conversely, peanuts roasted to a lighter color should preferably be milled to a larger particle size because of the high volatility of the flavors generated during roasting.

The nut solids-containing mixtures according to the prevent invention comprise from about 20 to about 55% nut solids, preferably from about 30 to about 45% nut solids. These nut solids are typically dispersed or suspended in oil derived from the respective nut that is commonly referred to as a "nut paste." The oil used in the nut spreads is typically that which naturally comes from the nut or seed during the formation of the nut paste. However, oils such as soybean oil, palm oil, cottonseed oil, coconut oil, walnut oil and other suitable edible oils can also be used, in whole or in part, in making the nut spreads of the present invention. Preferably, peanut oil expressed during formation of the peanut paste is the primary oil used in making peanut butters according to the present invention. For nut spreads made from other nuts and oil seeds, such as the sunflower seeds, mixtures of oils can be preferred for flavor. Low calorie and zero calorie fat and oil substitutes (as previously described) can also be used.

The nut paste can be made by comminuting nuts using any conventional grinder such as Bauer mill, Urschel or Fitzmill that provides an oil continuous suspension and reduces the viscosity of the paste, but does not excessively strip nut flavor volatiles. The total fat present (obtained during comminution of the nuts or by separate fat/oil addition) in the nut solids-containing mixture of the present invention can vary widely depending upon the viscosity desired, the fat level desired and like factors. Nut solids-containing mixtures of the present invention typically comprise from about 30 to about 60% total fat. Nut solids-containing mixtures of the present invention preferably comprise from about 40 to about 55% total fat.

The nut solids-containing mixtures of the present invention can also optionally comprise sugar. Typically, the nut solids-containing mixture comprises from 0 to about 25% sugar, preferably from about 3 to about 20%, most preferably from about 6 to about 15%, sugar. Suitable sugars include those previously described for the fluid suspension of sugar and liquid oil The nut solids-containing mixtures of the present invention can also comprise salt or salt substitutes such as sodium chloride, potassium chloride, sodium chloride/potassium chloride mixtures, and seasoned salts. The level of salt or salt substitute used is a matter of the desired taste level, but usually is from about 0.1 to about 2%, preferably from about 0.5 to about 1.5%, of the nut solids-containing mixture.

The nut solids-containing mixtures of the present invention can also comprise from about 0.01 to about 0.02% citric acid. Preferably from about 0.01 to about 0.015% citric acid is used. The addition of citric acid can enhance the roasted nut and especially the roasted peanut butter flavor and saltiness impression, thereby reducing the amount of salt required to give the resulting nuts spreads, especially peanut butters, of the present invention an acceptable flavor. The addition of citric acid, especially in the presence of a metallic ion salt, also allows the nut spread to achieve oxidative stability through chelation of the metal ions by the citric acid.

Water soluble bulking agents can also be used in the nut solids-containing mixtures of the present invention. These bulking agents typically add body or texture to the spread and can be non-nutritive or low calorie materials. Suitable bulking agents include corn syrup solids, maltodextrin, dextrose, polydextrose, mono- and disaccharides, starches (e.g., corn, potato, tapioca wheat), as well as mixtures of these agents. Corn syrup solids, polydextrose (from Pfizer Chemicals) and maltodextrin are preferred bulking agents. Sugar substitutes which function like sugars but which are non-nutritive can also be used herein. Such sugar substitutes include the 5-C-hydroxyalkylaldohexoses described in U.S. Pat. No. 5,041,541 (Mazur), issued Aug. 20, 1991.

Like the fluid suspension, in order to minimize grittiness, the water-soluble solids in these nut solids-containing mixtures such as the sugar, salt and the like preferably have a relatively fine particle size. Typically, the water-soluble solids have a mean particle size of from about 20 microns or less (as measured by a laser particle size analyzer such as Malvern laser) with at least about 90% of the particles having a particle size of about 35 microns or less.

The nut solids-containing mixtures of the present invention can comprise solids other than nut solids and water soluble solids, typically in combined amounts of up to about 10%, preferably up to about 5%. These other solids can include fiber, such as cellulose, flours (e.g., wheat, rye, pea) and protein supplements such as additional peanut solids, soy flour, soy concentrate, soy isolate, casein, egg whites, and protein from other animal or vegetable sources; or any combination thereof.

The nut solids-containing mixtures of the present invention can also optionally but preferably comprise a nut butter stabilizer in effective amounts up to about 5%. Preferably from about 1 to about 3% nut butter stabilizer is used. These nut butter stabilizers can be any of the known peanut butter stabilizers, for example, hydrogenated rapeseed oil, or other hydrogenated triglycerides having a high proportion of $C_{20}$ and $C_{22}$ fatty acids. See for example, U.S. Pat. No. 3,265,507 (Japikse), issued Aug. 9, 1966 and U.S. Pat. No. 3,129,102 (Sanders), issued Apr. 14, 1964), which are incorporated by reference. These stabilizers are usually triglycerides that are solid at room temperature. They solidify in the nut spread in specific crystalline states and keep the oil from separating. These materials can be mixed with a second hydrogenated oil having an iodine value of less than 8, for example hydrogenated palm oil, canola oil, soybean oil, rapeseed oil, cottonseed oil, coconut oil, and similar materials. This stabilizer can also be mixed with lower melting fat fractions as, for example, the peanut butter stabilizer composition disclosed in U.S. Pat. No. 4,341,814 (McCoy), issued Jul. 27, 1982, which is incorporated by reference.

Particularly suitable nut butter stabilizers for use in the nut solids-containing mixtures of the present invention include tailored β' stable hardstocks referred to as "PSP/PSS" hardstocks, as disclosed in U.S. Pat. No. 4,996,074 (Seiden et al), issued Feb. 26, 1991, which is incorporated herein by reference. Highly hydrogenated high erucic acid rapeseed oil shown in Example VI of this patent is an example of a β' tending hardstock particularly suitable for use in combination with the PSP/PSS hardstock. When the PSP/PSS hardstock is used in combination with highly hydrogenated (Iodine Value less than 20, preferably less than 10) high erucic acid (preferably at least about 40%) rapeseed oil, it should be used in ratios of PSP/PSS hardstock:high erucic acid rapeseed oil of from about 30:1 to about 10:1, preferably from about 27:1 to about 20:1. The high erucic acid rapeseed oil is more fully discussed in this patent at column 7, line 50 to column 8, line 14.

Emulsifier can also be used in the nut solids-containing mixtures of the present invention to achieve proper texture. The emulsifier can be any food compatible emulsifier such as mono- and di-glycerides, lecithin, sucrose monoesters, polyglycerol esters, sorbitan esters, polyethoxylated glycols and mixtures thereof. Up to about 5% and, preferably from about 0.01 to about 3% emulsifier is used. Additionally, when chocolate is used to flavor the spread, the selection of certain emulsifiers such as sorbitan monostearate and preferably sorbitan tristearate can impede or prevent the cocoa butter in the chocolate from crystallizing into fat nodules. For example, adding 1% sorbitan tristearate is effective in preventing the cocoa butter in the chocolate from crystallizing into fat nodules after the chocolate is blended with the nut solids-containing mixture.

D. Flavorants

The nut spreads prepared according to the present invention from the fluid suspension and the nut solids-containing mixture preferably further comprise an effective amount of a flavorant. As used herein, the term "flavorant" refers to any agent, material or composition (other than a sweetener such a sugar or flavor enhancer such as salt) that contributes flavor characteristics to the nut spread beyond the flavor characteristics inherently present in the nut solids-containing mixture. These include natural and artificial flavors, such as apple flavors, grape flavors, cherry flavors, pineapple flavors, and peach flavors, berry flavors such raspberry, blackberry, blueberry, elderberry and strawberry, citrus flavors such as orange, lemon, lime and grapefruit, nonfruit flavors such as cinnamon, coffee, vanilla, chocolate (e.g., cocoa powder, dark and milk chocolate and the like), chocolate mint, amaretto, anisette, brandy, cappuccino, chamomile, creme, creme de menthe, french vanilla, grand mariner, Irish creme, kahlua, peppermint stick, pistachio, and the like, as well as mixtures of these flavorants. These flavorants can be obtained from flavor oils, extracts, oleoresins, essential oils and the like known in the art for supplying such flavorants. These flavorants can also be delivered from various carrier components such as flavored or flaked bits, either natural or artificial.

In the case of chocolate flavored nut spreads according to the present invention, the preferred source of chocolate is a refined mixture of cocoa solids and sugar, where the cocoa solids are encapsulated or enrobed by the sugar as disclosed in copending U.S. application Ser. No. 08/958,351, to Vincent York-Leung Wong, Michael Charles Schmidt and Jing Chen, filed Oct. 27, 1997, which is incorporated by reference. These encapsulated or enrobed cocoa solids impart a more milk chocolate-like flavor (even though the chocolate is substantially free of dairy solids) and avoid imparting a bitter aftertaste to the nut spreads.

This preferred chocolate source involving encapsulated or enrobed cocoa solids can be formulated from a mixture comprising chocolate liquor and/or cocoa powder and sugar. In the case of chocolate liquor, the ratio of sugar to liquor is typically in the range of from about 30:70 to about 70:30, preferably from about 40:60 to about 60:40. In the case of cocoa powder, a fat or oil other than cocoa butter is usually included in addition to the sugar. Typically such mixtures comprise from about 15 to about 40% cocoa powder, from about 15 to about 35% fat/oil and from about 40 to about 70% sugar, preferably from about 20 to about 30% cocoa powder, from about 20 to about 30% fat/oil and from about 40 to about 60% sugar. Other confectionery ingredients typically present in chocolate formulations such emulsifiers (e.g., lecithin), salt and the like can also be included.

After these ingredients are mixed together, the resulting mixture is then subjected to a conventional chocolate refining step where the solids in the mixture are reduced in size (in particular the sugar), and, most importantly, the cocoa solids are encapsulated or enrobed within the sugar. Typically, four or five water-cooled rolls, each progressively faster in speed, are used to refine the mixture. Pressure between the rolls is adjusted to achieve the desired fineness for the solids. Contact with moisture is also desirably avoided during refining. In particular, the rolls should not be cooled to or below the dewpoint of ambient air. The consistency of the chocolate formulation after refining is typically that of flakes or a powder.

After refining, this preferred chocolate formulation is typically ready for use in the present invention. For example, other conventional chocolate processing steps such as wet or dry conching, or tempering are not required. A commercially available chocolate particularly suitable for use in the present invention is a semi-sweet chocolate powder manufactured by Barry Callebaut in Montreal, Canada by roll refining a mixture of 60% sugar and 40% chocolate liquor.

E. Preparation of Nut Spreads From Nut Solids Mixture, Fluid Suspension and Flavorants The nut spreads of the present invention are prepared by combining the fluid suspension and the nut solids-containing mixture so as to form a substantially homogeneous blend. Intense mixing such as high shear mixing is not required to form a substantially homogeneous mixture from the fluid suspension and the nut solids-containing mixture. For example, simple batch mix tanks such as a Hamilton and Groen mix kettles are suitable. A substantially homogeneous blend can also be formed from the fluid suspension and the nut solids-containing mixture by simply passing these two streams through a static mixer or more typically a series of static mixers. The temperature of the fluid suspension and the nut solids-containing mixture as they are combined together should be such that it is above the melting point of any nut butter stabilizer present. Typically, the temperature of the fluid suspension and the nut solids-containing mixture is at least about 150° F. (65.6° C.) when combined together and typically in the range of from about 150° to about 160° F. (from about 65.6° to about 71.1° C.). (When chocolate flavored spreads are formed, heating to these temperatures also ensures that any cocoa butter present in the chocolate source is melted.)

In forming flavored nut spreads, the flavorant(s) can be added to the fluid suspension, the nut solids-containing mixture or both. Preferably, the flavorant(s) is added to the fluid suspension. It was surprisingly discovered that adding the flavorants first to the fluid suspension of sugar and liquid oil lowered the viscosity of the resultant flavored suspension. When this lower viscosity flavored fluid suspension was then blended with the nut solids-containing mixture, the resultant flavored nut spread viscosity was also substantially lowered (typically by at least about 1000 centipoise) relative to a flavored nut spread where the flavorant was added directly to the spread, as well as achieving this substantially lower viscosity in less mixing time. It is believed that this is due to an order of addition effect where the surfactant in the fluid suspension is able to be efficiently mixed with and/or adsorbed by the flavorants.

The particular ratio at which the fluid suspension and the nut solids-containing mixture are combined together depends on a number of factors, including the level of sugar in each, the level of fat/oil in each and, in the case of flavored nut spreads, the particular flavorant that is used. For most nut spreads and especially flavored nut spreads, the ratio of fluid suspension to nut solids-containing mixture is typically in the range of from about 15:85 to about 60:40, and preferably in the range of from about 20:80 to about 50:50. For example, in the case of flavored nut spreads where the flavorant source contains little or no sugar (e.g., apple-cinnamon or berry flavored), the ratio of fluid suspension to nut solids-containing mixture tends to be at the lower end of this range. By contrast, in the case of flavored nut spreads where the flavorant source contains higher levels of sugar (e.g., chocolate flavored), the ratio of fluid suspension to nut solids-containing mixture tends to be at the higher end of this range.

The flavored nut spreads prepared by combining the flavorant, fluid suspension and nut solids-containing mixture according to the present invention have a spreadability value of from about 500 to about 1400 gram force, preferably from about 700 to about 1200 gram force. See Analytical Methods section hereafter for how spreadability values are measured according to the present invention. In addition, these flavored spreads typically have a penetration value measured by a Precision Universal Penetrometer typically in the range of from about 250 to about 325 mm. These flavored nut spreads also comprise:

a. a flavor enhancing amount of a flavorant, typically from about 1 to about 20%;

b. from about 20 to about 55%, preferably from about 25 to about 40%, nut solids;

c. from about 30 to about 60%, preferably from about 35 to about 50%, total fat;

d. from about 15 to about 50%, preferably from about 20 to about 35%, sugar;

e. optionally, but preferably from about 0.25 to about 3%, preferably from about 1 to about 2%, nut butter stabilizer;

f. from about 0.01 to about 5%, preferably from about 0.01 to about 1%, emulsifier;

g. other optional components typically included in nut spreads such as salt.

If desired, nut chunks, including defatted nut chunks, flavored or candied bits and other optional components can be included in the nut spreads of the present invention at various levels.

ANALYTICAL METHODS

1. Viscosity

A Brookfield Viscometer (HAT series), 5C4-13R chamber with a 8C4-27 spindle is used. This arrangement consists of a spindle "bob" of 0.465 inches (1.12 cm). The inner diameter of the sample cell is 0.750 inches (1.87 cm). The instrument is calibrated at 65° C. (149° F.) and all samples are measured at 65° C. (149° F.).

A 14.0 gram sample of the composition to be measured is placed in the sample cell. The sample cell is then inserted in the jacketed cell holder. To compensate for heat losses through the tubings, etc., the water temperature entering the jacketed cell holder should be a few degrees higher than the desired sample temperature of 65° C. (149° F.). After the temperature of the sample has reached 65° C. (149° F.) the sample is pre-sheared for five minutes at 50 rpm. The speed is then changed to 100 rpm and a measurement taken after the dial reading settles to a constant value. A total of five scale readings are recorded for 100, 50, 20, 10 and 5 rpm. In general, the time before reading should be as set forth in Table I.

TABLE I

| RPM | Time Before Reading (Seconds) |
|---|---|
| 100 | 3 |
| 50 | 6 |
| 20 | 15 |
| 10 | 30 |
| 5 | 60 |

The dial reading and rpm are converted into shear stress and shear rate values by multiplying the rpm and dial reading by 0.34 and 17, respectively. The viscosity of the compositions measured according to the present invention is at 20 rpm or 6.8 $sec^{-1}$. A plot of the square root of shear stress vs. the square root of shear rate results in a straight line. Readings where the dial pointer goes off scale are ignored. A least squares linear regression is made over the data to calculate the slope and intercept.

This data is used to calculate two values. The first of these is the plastic viscosity that is equal to the slope of the line squared. The plastic viscosity is a measurement of the viscosity of the composition at an infinite shear rate. It accurately predicts the resistance to flow in pumping, moving or mixing situations. The Casson plastic viscosity is measured in poise.

The second value is the yield value that is equal to the value of the x intercept (abscissa) squared. The yield value is a measure of amount of force or shear that is necessary to get the product to start moving. The yield value is measured in dynes/$cm^2$. The relationship between the plastic viscosity and the yield value determine how the product will behave in additional processing.

2. Spreadability Measurement Method

The spreadability of nut spreads prepared according to the present invention can be determined by a puncture test performed on a TA.XT2 Food Texture Analyzer manufactured by Texture Technologies Corp. The spreads in normal peanut butter jars are kept in a constant 70° F. (21.1° C.) room for at least 48 hours and then moved to room temperature for 30 minutes before measurements were made. The test involves penetrating the spread in jars with a cone shaped probe at a constant speed. A stainless steel cone with 150° angle and 22.5 mm diameter is used. The penetration speed is 3.5 mm/s, while the penetration depth is 50 mm. The penetration is followed by retracting the probe at the speed of 2 mm/sec. The tests are performed at room temperature. The penetration curves generated by the texture analyzer are recorded by a computer. Five force measurements (Positive Peak Force, Negative Peak Force, Positive Force Area, Negative Force Area and Force Gradient) are obtained from the penetration curve. The Positive Peak Force correlates significantly with the spreadability and is used to define the spreadability of nut spreads according to the present invention.

EXAMPLES

The following are representative examples of flavored peanut butters and spreads prepared according to the present invention.

A. Peanut Solids-Containing Mixtures

The peanut solids-containing mixture used in the following Examples is prepared from the following ingredients:

| Ingredients | % |
| --- | --- |
| Peanuts | 86.2 |
| Sugar | 10.0 |
| Salt | 1.2 |
| Molasses | 0.5 |
| Stabilizer | 1.8 |
| Emulsifier | 0.3 |

A peanut paste is prepared by roasting the peanuts at 405° F. (207.2° C.) for 4.5 minutes in a Wolverine Jet Zone roaster in order to develop the desired peanut flavor. The roasted peanuts are then discharged from the roaster and cooled to 100° F. (37.8° C.). Next, the cooled nuts are blanched and passed through a color sorter to remove nuts falling outside of the desired color target. The color sorted peanuts are converted into a flowable peanut paste by milling the nuts in a Bauer mill. The paste is then added to a 100 gallon Hamilton mix kettle where the remaining ingredients are added. After mixing at 150° F., the peanut solids-containing mixture is homogenized at 3500 psi through a APV Gaulin M-8 homgenizer and stored in a mix tank.

B. Fluid Suspension of Sugar and Oil

The fluid suspension of sugar and liquid oil used in the following Examples is prepared from the following ingredients:

| Ingredients | % |
| --- | --- |
| Sugar | 57.3 |
| Peanut oil | 41.7 |
| Lecithin | 1.0 |

An Ekato mix kettle that has an anchor mixing blade and a Mizer disc is used that is fitted with a recirculation loop that allows a portion of the mixed material to be circulated through a pump and back to the mix kettle. A 400 pound batch of the fluid suspension is made as follows: First, 167 pounds of peanut oil is added to the mix kettle. The anchor agitator and Mizer disc are then turned on at 19 rpm and 540 rpm, respectively. The pump in the recirculation loop is also turned on to about 1500 lbs. Four pounds of lecithin is then added to the mix kettle and allowed to mix for about 5 minutes. Next, 229.2 lbs of 12X sugar is metered into the mix kettle at 230 lbs/hr. At the end of the sugar addition, the fluid suspension is allowed to mix for an additional 30 minutes to ensure complete mixing.

Example 1

A chocolate flavored peanut spread is prepared as follows: A chocolate flavored fluid suspension is first prepared by mixing in a Hamilton kettle 32.84 parts of the fluid suspension described above with 15 parts of a chocolate flavor mix consisting of chocolate powder (refined mixture of 60% sugar and 40% chocolate liquor), 0.18 parts vanilla flavor, 0.19 parts salt and 0.31 parts nut butter stabilizer. The contents of the mix kettle is heated at 150° F. (65.6° C.). The viscosity of the chocolate flavored suspension is about 5500 centipoise (6.8 sec$^{-1}$). The chocolate flavored peanut spread is prepared by adding the peanut solids-containing mixture described above to the chocolate flavored fluid suspension in the Hamilton mix kettle in a ratio of 48.52 parts flavored fluid suspension to 51.48 parts nut solids-containing mixture. To ensure good top to bottom mixing a recirculation loop with a pump is used with the kettle. After mixing, the resultant chocolate flavored spread has a viscosity of about 3000–3500 centipoise (6.8 sec$^{-1}$). This chocolate flavored spread is then processed through a normal peanut butter finishing operation that consists of processing the spread through a Versator to remove entrained air for improving the spread's oxidative stability and then through a Votator and picker for setting up the nut butter stabilizer. The spread is packed and allowed to temper. The finished flavored spread is stable to oil separation, yet is soft and highly spreadable. The spreadability value (as measured with the Texture Analyzer) is 800 gram force. The fat content of the flavored spread is 41.5%.

Example 2

An apple-cinnamon flavored peanut spread is prepared as follows: An apple-cinnamon flavored fluid suspension is first prepared by mixing in a 100 gallon Hamilton kettle 21.9 parts of the fluid suspension described above with 0.99 parts of cinnamon flavor mix, 0.2 parts of a fried flavor oil, 0.35 parts salt, 0.2 parts nut butter stabilizer and 0.52 parts peanut oil. The contents of the mix kettle are heated to 150° F. (65.6° C.) and mixed for about 20 minutes. To ensure good top to bottom mixing, a recirculation loop with a pump is used with the mix kettle. The viscosity of the apple-cinnamon flavored fluid suspension is about 2200 centipoise (6.8 sec$^{-1}$). The apple-cinnamon flavored peanut spread is prepared by adding the peanut nut solids-containing mixture described above to the apple-cinnamon flavored fluid suspension in the Hamilton kettle in a ratio of 24.16 parts flavored fluid suspension to 75.84 parts nut solids-containing mixture and then mixed for about 30 minutes. After mixing, the resultant apple-cinnamon flavored spread has a viscosity of about 2500 centipoise (6.8 sec$^{-1}$). This apple-cinnamon flavored spread then processed through a normal peanut butter finishing operation as in Example 1. For texture and appearance, apple flakes are added via the use of an ingredient feeder. The ratio of apple flakes to the spread is 0.044. The finished spread is then packed and allowed to temper. The finished flavored spread is stable to oil separation, yet is soft and highly spreadable. The penetration value for this spread is measured to be 300±10 mm and its spreadability value (as measured with the Texture Analyzer) is 800 gram force. The fat content of the spread is about 46%.

Example 3

A berry flavored peanut spread is prepared as follows: A berry flavored fluid suspension is first prepared by mixing in a Hamilton kettle 20.39 parts of the sugar slurry described earlier with 1.4 parts of a mixed berry flavored oil, 0.1 parts vanilla flavor, 0.8 parts of grape colored flake, 0.30 parts nut butter stabilizer and 3.55 parts peanut oil. The contents of the mix kettle are heated to 150° F. (65.6° C.). The viscosity of the flavored berry flavored suspension is about 350 centipoise (6.8 sec$^{-1}$). The berry flavored peanut spread is prepared by adding the peanut nut solids-containing mixture described earlier to berry flavored suspension in the Hamilton kettle in a ratio of 26.54 parts berry flavored suspension to 73.46 parts peanut nut solids-containing mixture. To ensure good top to bottom mixing, a recirculation loop with a pump is used with the mix kettle. After mixing, the viscosity of the resulting berry flavored peanut spread is about 1500 centipoise (6.8 sec$^{-1}$). This berry flavored spread product is then processed through a normal peanut butter finishing operation as in Example 1. The finished spread is packed and allowed to temper. The finished flavored spread is stable to oil separation, yet is soft and highly spreadable. The penetration value for this spread is measured to be 285±10 mm and its spreadability value (as measured with the Texture Analyzer) is 800 gram force. The fat content of the spread is about 48%.

Example 4

The chocolate flavored fluid suspension of Example 1 is mixed with the peanut solids-containing mixture on a bench scale in a Hobart mixer. The mixing of peanut solids-containing mixture with the chocolate flavored fluid suspension resulted in an instantaneously homogeneous mixture. Samples of this first spread are collected every 5 minutes and the viscosity measured.

A second chocolate flavored peanut spread with the identical formulation is prepared using the same Hobart mixer but without using the chocolate flavored fluid suspension. Instead, the chocolate powder and the sugar are directly added to the peanut spread containing the other ingredients. Samples are collected from this second spread and the viscosity measured after all of the ingredients are incorporated as a homogeneous mixture (about 10 minutes after chocolate powder and sugar are added).

The viscosities measured for the samples taken from the first and second spreads are shown in Table 1 below:

TABLE 1

| Mix Time (minutes) | Viscosity of First Spread (in centipoise at 6.8 sec$^{-1}$) | Viscosity of Second Spread (in centipoise at 6.8 sec$^{-1}$) |
| --- | --- | --- |
| 0 | 3238 | Cannot be measured |
| 5 | 3188 | 4113 |
| 10 | 3163 | 3925 |
| 20 | 3088 | 3850 |
| 30 | 3000 | 3763 |

As can be seen in Table 1 above, use of the chocolate flavored fluid suspension of sugar and oil allowed the first spread to achieve a relatively low mix viscosity in less than 5 minutes. By contrast, the second spread containing the same ingredients required more than 30 minutes of mixing before it reaching its lowest mix viscosity. Even after 30 minutes, the second spread made without the fluid suspension has a significantly higher viscosity than the first spread made with the fluid suspension. Indeed, in order to achieve a viscosity of 3350 centipoise, the second spread required 3 passes through a 2 inch colloid mill.

Example 5

Flavored fluid suspensions (chocolate, berry and apple-cinnamon) are mixed with the peanut solids-containing mixture as in Examples 1 to 3 and the viscosity is then measured after uniform mixing is achieved. Identical flavored spreads are also prepared but with the flavorants being directly added to the spread (without using the fluid suspension of sugar and oil) and the viscosity is then measured after uniform mixing is achieved.

The viscosities measured for the respective samples are shown in Table 2 below:

TABLE 2

| Falvorant | Viscosity of Spreads Made Using Fluid Suspension of Sugar and Oil to Which Flavors Added (in centipoise at 6.8 sec$^{-1}$) | Viscosity of Spreads Made Where Flavors Added to Spread (in centipoise at 6.8 sec$^{-1}$) |
| --- | --- | --- |
| Chocolate | 3000–3300 | 4600–4800 |
| Berry | 1250–1500 | 2375 |
| Apple-cinnamon | 2450 | 4200 |

As can be seen in Table 2 above, adding the flavorant first to the fluid suspension of sugar and oil allowed the resultant flavored spreads to achieve lower viscosities than the flavored spreads prepared by adding the flavorant to the spread.

What is claimed is:

1. A flavored nut spread having a spreadability value of from about 500 to about 1400 gram force and which comprises:
   a. a flavor enhancing amount of a flavorant;
   b. from about 20 to about 55% nut solids;
   c. from about 30 to about 60% total fat;
   d. from about 15 to about 50% sugar.

2. The spread of claim 1 which has a spreadability value of from about 700 to about 1200 gram force.

3. The spread of claim 1 which comprises from about 25 to about 40% nut solids and from about 35 to about 50% total fat.

4. The spread of claim 3 which comprises from about 20 to about 35%, sugar.

5. The spread of claim 3 which further comprises:
   e. from about 0.25 to about 3% of a nut butter stabilizer;
   f. from about 0.01 to about 5% of an emulsifier.

6. The spread of claim 5 which comprises:
   e. from about 1 to about 2% of a nut butter stabilizer;
   f. from about 0.01 to about 1% of an emulsifier.

7. The spread of claim 1 wherein the flavorant is selected from the group consisting of apple flavors, grape flavors, cherry flavors, pineapple flavors, and peach flavors, berry flavors, citrus flavors, cinnamon, coffee, vanilla, chocolate, chocolate mint, amaretto, anisette, brandy, cappuccino, chamomile, creme, creme de menthe, french vanilla, grand mariner, Irish creme, kahlua, peppermint stick, pistachio, and mixtures thereof.

8. A process for preparing nut spreads having sugar levels of from about 15 to about 50%, which comprises the step of forming a substantially homogeneous blend from:
   a. a fluid suspension, which consists essentially of:
      (1) an intimate mixture of sugar and an edible liquid oil wherein the ratio of sugar to oil is about 0.7:1 or greater;
      (2) an effective amount of an edible surfactant capable of imparting increased fluidity to the intimate mixture of oil and sugar; and
   b. a nut solids-containing mixture, which comprises:
      (1) from about 20 to about 55% nut solids;
      (2) from about 30 to about 60% fat;
      (3) optionally sugar;
   c. wherein the ratio of the fluid suspension to the nut solids-containing mixture is such that the resulting nut spread has a sugar level of from about 15 to about 50%.

9. The process of claim 8 wherein the fluid suspension comprises from about 0.01 to about 3% of the surfactant and wherein the surfactant is selected from the group consisting of mono- and di-glycerides, lecithin, sucrose monoesters, polyglycerol esters, sorbitan esters, polyethoxylated glycols and mixtures thereof.

10. The process of claim 9 wherein the surfactant is lecithin.

11. The process of claim 8 wherein the ratio of sugar to oil is about 1.1 or greater.

12. The process of claim 11 wherein the sugar is selected from the group consisting of sugar and high fructose corn syrups and wherein the oil is peanut oil.

13. The process of claim 8 wherein the ratio of sugar to oil is in the range of from about 0.7:1 to about 3:1.

14. The process of claim 8 wherein the fluid suspension has a viscosity of from about 200 to about 30,000 centipoise.

15. The process of claim 14 wherein the fluid suspension has a viscosity of from about 200 to about 3500 centipoise.

16. The process of claim 8 wherein an effective amount of a flavorant is added to the fluid suspension.

17. The process of claim 16 wherein the flavorant is selected from the group consisting of apple flavors, grape flavors, cherry flavors, pineapple flavors, and peach flavors, berry flavors, citrus flavors, cinnamon, coffee, vanilla, chocolate, chocolate mint, amaretto, anisette, brandy, cappuccino, chamomile, creme, creme de menthe, french vanilla, grand mariner, Irish creme, kahlua, peppermint stick, pistachio, and mixtures thereof.

18. The process of claim 16 wherein the nut solids containing mixture comprises from about 30 to about 45% nut solids and from about about 40 to about 55% total fat.

19. The process of claim 18 wherein the nut solids containing mixture comprises from about 5 to about 10% sugar.

20. The process of claim 16 wherein the ratio of the fluid suspension to the nut solids-containing mixture is in the range of from about 15:85 to about 60:40.

21. The process of claim 20 wherein the ratio of the fluid suspension to the nut solids-containing mixture is typically in the range of from about 20:80 to about 50:50.

22. The process of claim 16 wherein the ratio of the fluid suspension to the nut solids-containing mixture is such that the resulting flavored nut spread has a sugar level of from about 20 to about 35%.

* * * * *